W. H. DRAKE.

APPARATUS FOR PRODUCING ARTICLES FROM PULP.

APPLICATION FILED SEPT. 11, 1919.

Reissued Oct. 26, 1920.

14,973.

2 SHEETS—SHEET 1.

Inventor

Walter H. Drake

By Bradford Morrill & Pirman

Attorneys

W. H. DRAKE.

APPARATUS FOR PRODUCING ARTICLES FROM PULP.

APPLICATION FILED SEPT. 11, 1919.

Reissued Oct. 26, 1920.

14,973.

2 SHEETS—SHEET 2.

Inventor
Walter H. Drake

By Bradford Morrill Parsons
Attorneys

UNITED STATES PATENT OFFICE.

WALTER H. DRAKE, OF CLEVELAND, OHIO.

APPARATUS FOR PRODUCING ARTICLES FROM PULP.

14,973. Specification of Reissued Letters Patent. Reissued Oct. 26, 1920.

Original No. 1,274,148, dated July 30, 1918, Serial No. 211,076, filed January 9, 1918. Application for reissue filed September 11, 1919. Serial No. 323,210.

*To all whom it may concern:*

Be it known that I, WALTER H. DRAKE, a citizen of the United States, residing at Cleveland, in the county of Cuyahoga and State of Ohio, have invented certain new and useful Improvements in Apparatus for Producing Articles from Pulp; and I do hereby declare the following to be a full, clear, and exact description of the invention, such as will enable others skilled in the art to which it appertains to make and use the same.

This invention relates to apparatus for automatically producing hollow articles from paper pulp or the like and has for an object to provide a device for carrying into effect the process and apparatus generically disclosed in application, Serial Number 177,580, filed June 28, 1917, now Patent Number 1,305,203.

A further object of the invention is to provide a device embodying a separable foraminous mold complementary to the exterior configuration of the article to be molded with improved means for injecting the pulpy fluid into the mold, producing agitation and expelling the fluid carriage, leaving the cellular material of the pulp adhering to the mold to produce the article required.

A further object of the invention is to provide mechanism for operating in timed relation, the separable members of the mold, the pulp injection and the injection of an anhydrous fluid for expelling the fluid carriage.

A further object of the invention is to provide a separable mold having hinged sections with timing mechanism for opening and closing the hinged sections, such timing mechanism, also in proper timed relation, opening and closing respectively valves controlling the introduction of the pulpy material and air or like material for expelling the watery carriage and causing the cellular material to adhere to the mold.

With these and other objects in view, the invention comprises certain novel constructions, combinations, and arrangement of parts as will be hereinafter more fully described and claimed.

Figure 1:
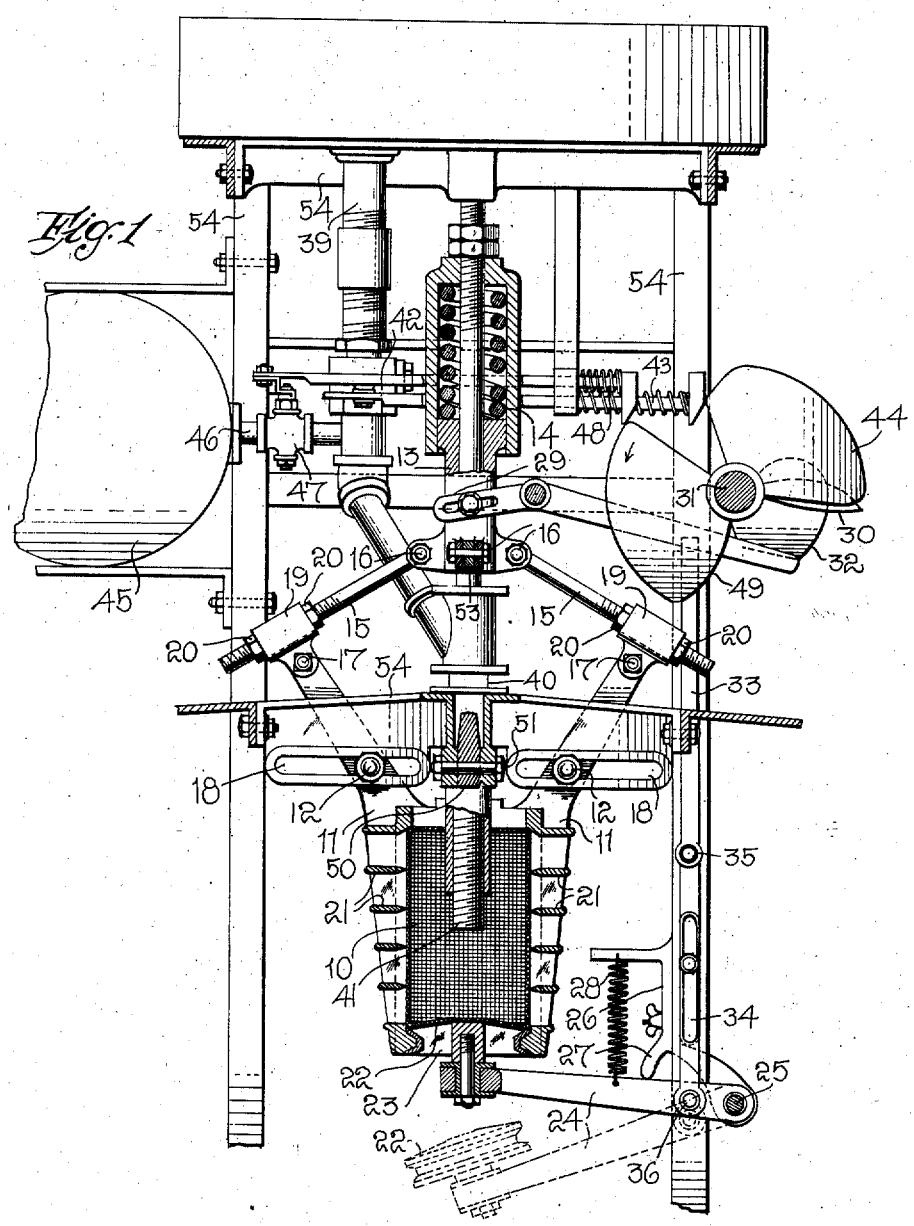

In the drawings, Figure 1 is a view of the improved apparatus in elevation, parts being broken away to show the internal construction.

Figure 2:
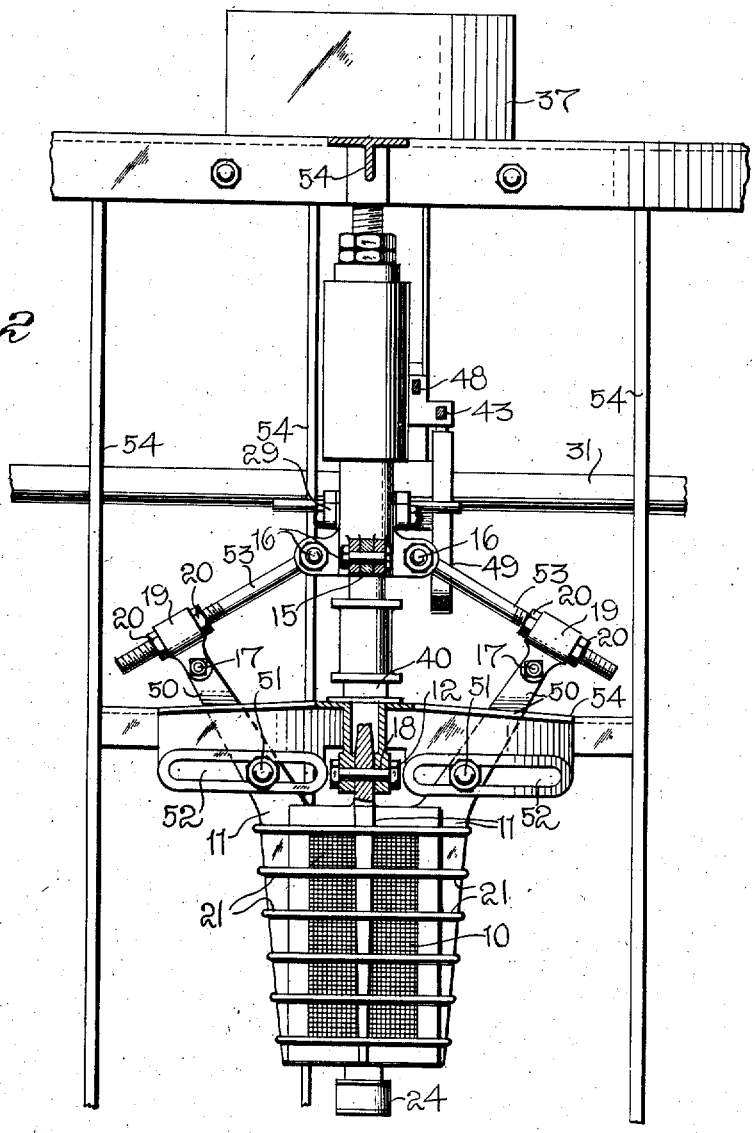

Fig. 2 is a view of the apparatus taken at right angles to Fig. 1, also showing some parts broken away.

Like characters of reference designate corresponding parts throughout the several views.

As disclosed in the said application 177,580, the process requires the use of a foraminous mold originally generically claimed and allowed therein and herein specifically indicated at 10 (which is here shown as cylindrical), but is intended to conform to any configuration of the article to be produced and from which mold-contour the article itself receives its shape.

The mold, indicated as a whole at 10, is composed of sections mounted upon levers 11, fulcrumed at 12. To swing the mold sections upon their fulcrums 12 and to open the mold to discharge the completed article, a sliding member 13 is provided, controlled yieldingly by a spring 14, tending to hold the levers 11 with the mold closed by reason of the toggle links 15 pivoted to the sliding member 13 at 16, and to the levers 11 at 17.

As it is the purpose of this apparatus to accommodate molds of different sizes, it is desirable to make the section carriers adjustable, for which purpose, the fulcrums 12 are slidable in slots 18 and the pivots 17 are carried by sleeves 19 upon the links 15, with lock nuts 20 so that the levers 11 may be moved nearer to or farther from the axis of the mold without disturbing the inclination of such levers.

The levers 11 are provided with ribs 21 which are preferably reduced to knife edges where they bear against the foraminous material of the mold to offer the minimum resistance to the ejecting of the watery material through such mold walls, and at the same time, to support the walls of the mold against bulging or distortion.

The bottom of the mold 22 is carried upon the collar 23, which is in turn carried upon the lever 24, whereby the bottom section of the mold, also constructed of foraminous material, may be thrown to the dotted line position shown at Fig. 1. To provide for using molds of different lengths the lever 24 is pivoted as at 25 to a sliding member 26, which sliding member likewise carries a stop 27 and a spring 28, tending to hold the mold bottom section normally yieldingly in closed position.

To actuate the sections of the mold, the levers 11 are controlled by a lever 29, which is in turn actuated by a cam 30 carried upon the cam shaft 31, so that as the cam shaft 31 carrying the cam 30 rotates, the lever 29 is oscillated by the cam 30, moving the sliding member 13 against the tension of the spring 14, to open and close the sections of the mold carried by the levers 11.

In proper timed relation, the cam 32 also carried upon the shaft 31, engages the plunger rod 33, which controls the lever 24, carrying the bottom section of the mold to open such mold against the tension of the spring 28. To provide for the adjusting of the lever 24, hereinbefore referred to, the plunger rod 33 is made telescopic as indicated at 34, a joint 35 being provided to compensate for the movement of the pivot 36 about the arc with the fulcrum 25 as its center.

To supply pulp-carrying fluid, a tank 37 is provided communicating through a conduit 39 with the tube 40 which extends downwardly within the mold 10. The tube 40 is provided with a telescopically adjustable extremity 41 whereby the discharge of fluid from such tube 40 may be controlled to be nearer to or father from the bottom of the mold. The flow of material through the conduit 39 is controlled by valve 42 which in turn is controlled by a plunger 43 engaged by a cam 44 carried upon the cam shaft 31. Adjacent the structure, a container 45 is provided for heated fluid such as hot air, superheated steam or the like, with a branch conduit 46 communicating with the conduit 39 between the valve 42 and the mold 10. The branch conduit 46 is controlled by a valve 47 which is in turn controlled by a plunger 48 actuated by the cam 49, also upon the cam shaft 31.

If the mold is cylindrical or circular, the use of two side wall sections is found ample, but with the use of molds irregular in shape, it is found desirable or necessary to divide the mold into more than two sections. For this purpose, side levers 50 are provided substantially identical with the levers 11, fulcrumed at 51 in slots 52, similar to the fulcruming of the levers 11 and controlled by links 53 connected with the sliding member 13, similar to the controlling of the links 15 hereinbefore described.

The entire structure is supported upon frame 54, which is of such size and structure as is necessary to support the various hereinbefore described parts, it being understood that if any part of the frame necessary to support a structural part has been omitted, it will be supplied in the usual well known manner.

In operation, the mold will be closed as indicated in the drawings, and the valve 42 will be opened by the movement of the cam shaft 31 and cam 44 from the position shown at Fig. 1. The valve 42 remains open for a sufficient length of time to admit to the mold 10, sufficient of the pulp carrying fluid to supply the requisite cellular material for the purpose required, and to actively agitate and ebullate the pulp fluid already introduced whereupon with the passing of the cam 44 from the plunger 43, the valve 42 will close. Substantially simultaneously with the closing of the valve 42, valve 47 will be opened by the engagement of the cam 49, with the plunger 48, permitting the introduction of hot air or steam from the container 45 through the conduit 39, into the mold 10. The introduction of such heated fluid will cause a continued active agitation and ebullition of the contained pulp carrying fluid to distribute the pulp in a substantially uniform sheet over the entire surface of the mold wall and at the same time the pressure exerted by such heated fluid will drive out the water or fluid carriage, leaving the cellular material of the pulp adhering to the walls of the mold. The continued supply of hot air or steam will drive out most of the moisture from the interstices of the adhering pulp drying the formed article to a considerable extent, while yet contained within the mold.

It has heretofore been the teaching of the prior art that it is undesirable to agitate the pulp in engagement with the mold walls and the apparatuses of the prior art disclose means for overcoming and preventing any such agitation or ebullition and any ebullition or agitation directly in contact with the mold walls is purely incidental and accidental. The present invention departs from that teaching in that it discloses and claims agitation, ebullition or other movement of the pulp directly against and in contact with the mold walls during the deposition and discloses and describes apparatus especially fitted for producing such action.

While it is the primary object of the invention to produce containers, such as bottles, cans, boxes, and the like by the use of this apparatus, it is obvious that other articles, such as toys, dolls, human figures and numerous other articles can likewise, with equal facility be produced, depending upon the size and shape of the mold.

The article being thus formed within the mold of the required configuration to produce the article required, the mold is opened to discharge the completed article by the engagement of the cam 30 with the lever 29 connected to the levers 11 and 50, and also the engagement of the cam 32 with the plunger 33, throwing the bottom section of the mold downwardly whereby the article drops by gravity to any prearranged receiver.

The continued rotation of the cam shaft again closes the bottom section of the mold to operative position and the side sections upon such bottom section, and the whole operation is repeated, it being wholly automatic in its action.

Having thus fully described my said invention, what I claim as new and desire to secure by Letters Patent, is:

1. An apparatus for the production of articles from pulp, comprising a separable foraminous mold, means to open and close the sections of the separable mold, a source of pulp supply, means to control the flow of pulp from the supply into the mold, a source of anhydrous fluid supply, means to control the introduction of the anhydrous fluid into the mold following the introduction of the pulpy material, and means whereby the introduction of the anhydrous fluid causes an agitation of the pulpy material contained in the mold.

2. An apparatus for the forming of articles from pulp, comprising a foraminous mold in separable sections, a source of pulp supply, a conduit leading from the source of pulp supply to the mold, a valve for controlling the flow of pulp through the conduit, a source of anhydrous fluid supply, a valve adapted to control the flow of anhydrous fluid into the mold, and timing mechanism adapted to actuate the mold sections and the valves in proper timed relation.

3. An apparatus for producing articles from pulp, comprising a foraminous mold in separable sections, means to open and close the sections of the mold, a source of pulp supply, means to control the flow of pulp into the mold after the closing of the sections, a source of anhydrous fluid supply and means to control the introduction of anhydrous fluid into the mold after the introduction of the pulp and means to control the several controlling means.

4. An apparatus for producing articles from pulp, comprising a foraminous divisible mold, a timing mechanism adapted to open and close the mold, a source of pulp supply, a conduit leading from the source of supply to the mold, means actuated by the timing mechanism for introducing pulpy material to the mold after the closing of such mold, a source of anhydrous fluid supply, means actuated by the timing mechanism for controlling the introduction of anhydrous fluid into the mold after the interruption of pulp, and means to interrupt the introduction of anhydrous fluid preceding the opening of the mold.

5. An apparatus for producing articles from pulp, comprising a foraminous mold in separable sections, levers carrying the sections of the mold, a timing mechanism embodying a cam adapted to actuate the levers to open and close the mold sections, a source of pulp supply, a source of anhydrous fluid supply, and means to introduce the pulp supply and the anhydrous fluid supply to the mold successively.

6. An apparatus for producing articles from pulp, comprising a plurality of levers adjustable toward and from the axis of the mold, mold sections carried by the levers, means to actuate the levers, and means to successively introduce pulp and anhydrous fluid under pressure to the mold in its closed condition.

7. An apparatus for producing articles from pulp, comprising a mold of separable foraminous sections, means to close the mold to correspond in configuration to the article to be produced, a pipe extending downwardly into the mold, means to adjust the extremity of the pipe to a position nearer to or farther from the top of the mold.

8. An apparatus for producing articles from pulp, comprising a mold of foraminous sections, a pipe extending downwardly into the mold and a telescoping section carried at the end of the pipe.

9. An apparatus for producing articles from pulp, comprising a foraminous mold, a pipe extending into the mold and terminating at a point short of the opposite wall of the mold, a telescopic section carried by the pipe, adapted to vary the distance between the extremity and the opposite wall, means to introduce pulp into the mold, and means to simultaneously exert agitation and pressure upon the pulpy content.

10. A mold for making articles from pulp, comprising a plurality of mold sections formed of foraminous material, an inlet duct extending axially the major portion of the distance across the mold and adjacent to the opposite wall and spaced from the sides for introducing pulp-carrying fluid at a point adjacent the end opposed to the inflow and forming a chamber between the walls of the mold and said duct.

11. A mold for making articles of pulp, comprising a plurality of mold sections formed of foraminous material, an inlet duct extending centrally of the mold and spaced from the sides and bottom thereof for introducing pulp-carrying fluid at a point near the bottom of the mold, said duct forming an annular chamber between the walls of the mold and said duct and means to vary the length of the duct and its relation to the bottom of the mold.

12. A mold for making articles of pulp, comprising a plurality of mold sections formed of foraminous material, an inlet duct extending axially the major portion of the distance across the mold and adjacent to the opposite wall and spaced from the sides for introducing pulp-carrying fluid at a point adjacent to the end opposed to the inflow and forming a chamber between the walls of the mold and said duct and means to introduce an anhydrous pressure-producing fluid through said duct.

13. A mold for making articles of pulp comprising a plurality of mold sections formed of foraminous material, a pulp-inlet duct extending centrally of the mold and spaced from the side and bottom walls thereof, means to employ said duct for introducing air at a point near the bottom of the mold in direct contact with the pulp, said duct forming an annular chamber between the walls of the mold and said duct and constituting means to cause a flow of pulp upwardly within said chamber, uniformly upon all sides of the duct.

14. An apparatus for making articles from pulp comprising a foraminous mold and means to introduce pulp-liquor into the mold and maintain it in ebullition until the fibers deposit upon the mold.

In testimony whereof, I affix my signature.

WALTER H. DRAKE